United States Patent
Kinoshita et al.

(10) Patent No.: US 7,442,030 B2
(45) Date of Patent: Oct. 28, 2008

(54) MOLDED COMPONENT RETRIEVING APPARATUS AND A MOLDING MACHINE HAVING THE MOLDED COMPONENT RETRIEVING APPARATUS MOUNTED THEREON

(75) Inventors: Satoshi Kinoshita, Minamitsuru-gun (JP); Mitsuhiro Yasumura, Minamitsuru-gun (JP); Hikaru Yamashiro, Minamitsuru-gun (JP)

(73) Assignee: Fanuc Ltd., Yamanashi (JP)

( * ) Notice: Subject to any disclaimer, the term of this patent is extended or adjusted under 35 U.S.C. 154(b) by 234 days.

(21) Appl. No.: 11/073,710

(22) Filed: Mar. 8, 2005

(65) Prior Publication Data

US 2005/0196483 A1   Sep. 8, 2005

(30) Foreign Application Priority Data

Mar. 8, 2004   (JP) ............................ 2004-064666

(51) Int. Cl.
*B29C 33/44* (2006.01)
*B29C 45/42* (2006.01)

(52) U.S. Cl. .............................. 425/444; 425/436 RM; 901/14; 901/16

(58) Field of Classification Search .......... 425/436 RM, 425/444, 556; 901/14, 16
See application file for complete search history.

(56) References Cited

U.S. PATENT DOCUMENTS

| | | | | |
|---|---|---|---|---|
| 3,561,614 A | * | 2/1971 | Tezuka et al. .......... | 198/750.11 |
| 4,620,831 A | | 11/1986 | Poncet et al. ................ | 414/744 |
| 5,046,992 A | | 9/1991 | Tamai et al. ................... | 474/84 |
| 5,423,648 A | * | 6/1995 | Akeel et al. ............... | 198/468.2 |
| 5,848,556 A | * | 12/1998 | Ryu et al. ................ | 74/490.02 |
| 6,324,934 B1 | * | 12/2001 | Monaghan ............... | 74/490.04 |
| 6,400,115 B1 | * | 6/2002 | Yamazoe ............... | 318/568.11 |
| 6,471,504 B1 | | 10/2002 | Matsui ....................... | 425/556 |
| 6,516,866 B1 | * | 2/2003 | Jones .......................... | 164/132 |
| 6,675,069 B2 | * | 1/2004 | Uratani ....................... | 700/245 |
| 2002/0086085 A1 | * | 7/2002 | Takayama et al. ........... | 425/556 |
| 2003/0085681 A1 | | 5/2003 | Sakamoto et al. ...... | 318/568.16 |
| 2003/0152661 A1 | * | 8/2003 | Yu et al. ............. | 425/436 RM |
| 2005/0202116 A1 | * | 9/2005 | Kinoshita et al. ........... | 425/444 |

FOREIGN PATENT DOCUMENTS

| | | |
|---|---|---|
| DE | 0 629 475 A1 | 12/1994 |
| JP | 59-88271 | 5/1984 |
| JP | 62-19389 | 1/1987 |
| JP | 1-95028 | 4/1989 |

(Continued)

*Primary Examiner*—Yogendra Gupta
*Assistant Examiner*—Emmanuel S Luk
(74) *Attorney, Agent, or Firm*—Drinker Biddle & Reath LLP

(57) ABSTRACT

A molded component retrieving apparatus and a molding machine with the molded component retrieving apparatus include first and second units. The first unit includes a base, first to third arms and a first lift arm. The second unit includes fourth to sixth arms and a second lift arm. The second unit is removably mounted on the third arm through an intermediate base member. Rotary shafts of the arms are parallel. A holding unit to hold and retrieve the molded component or the runner is arranged at the forward end of the first and second lift arms. The third and sixth arms can be kept in position even when the drive sources are reduced in number and other arms are pivoted using a belt and a pulley.

14 Claims, 13 Drawing Sheets

FOREIGN PATENT DOCUMENTS

| | | |
|---|---|---|
| JP | 01-216786 | 8/1989 |
| JP | 02-279286 | 11/1990 |
| JP | 03-154791 | 7/1991 |
| JP | 6-5880 | 1/1994 |
| JP | 9-201849 | 8/1997 |
| JP | 10-006267 | 1/1998 |
| JP | 2000-233393 | 8/2000 |
| JP | 2003-177877 | 4/2003 |

* cited by examiner

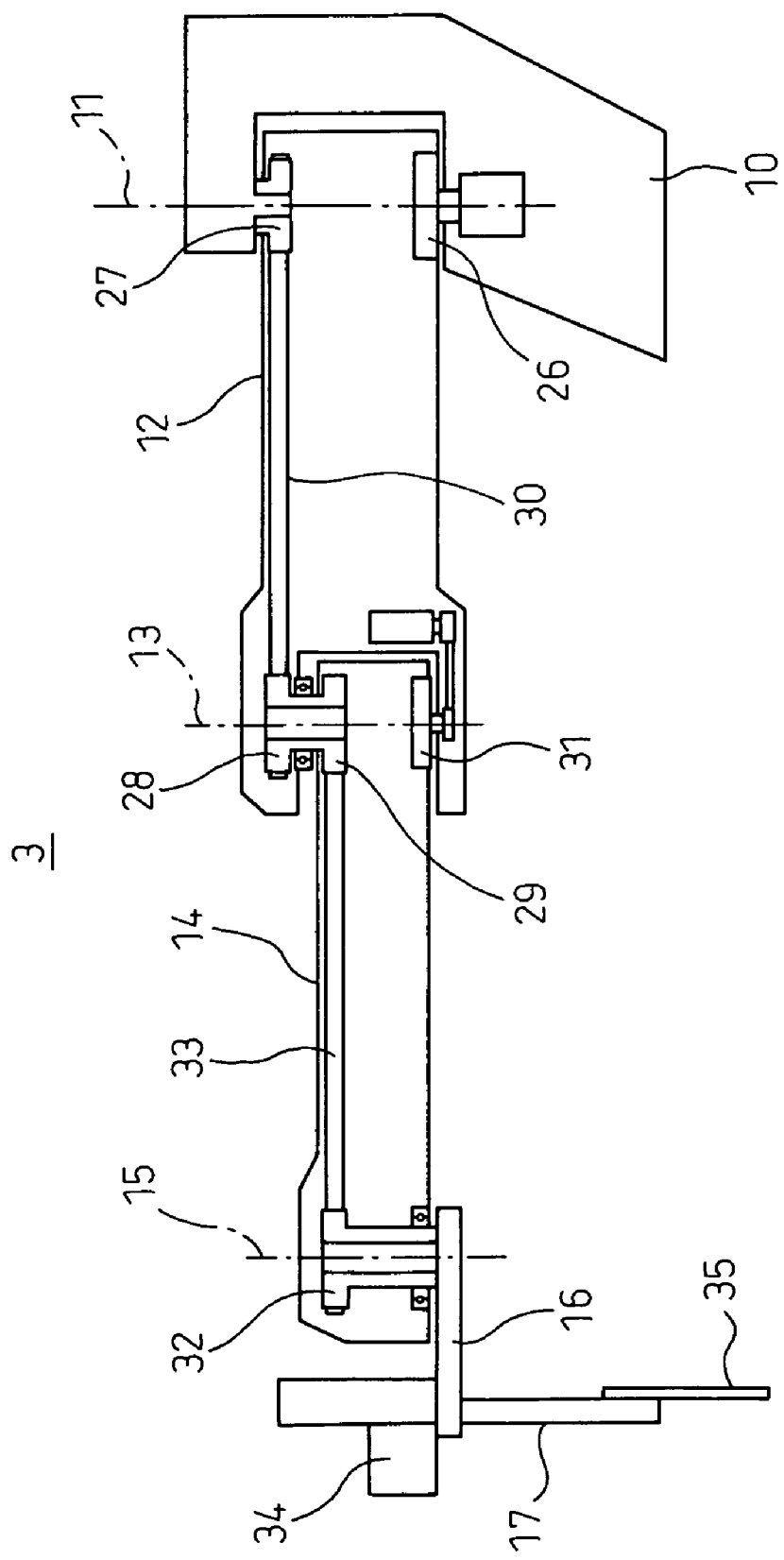

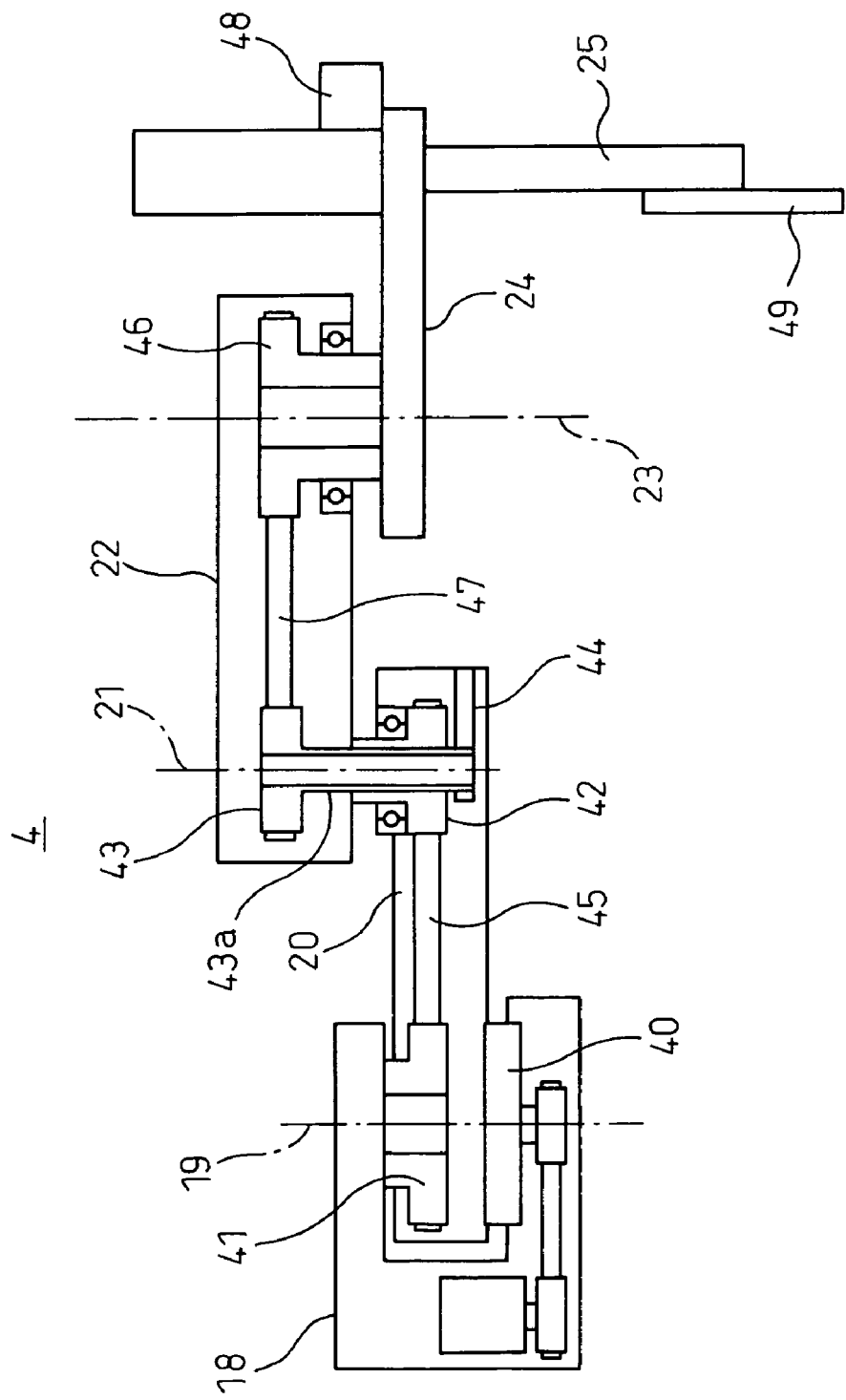

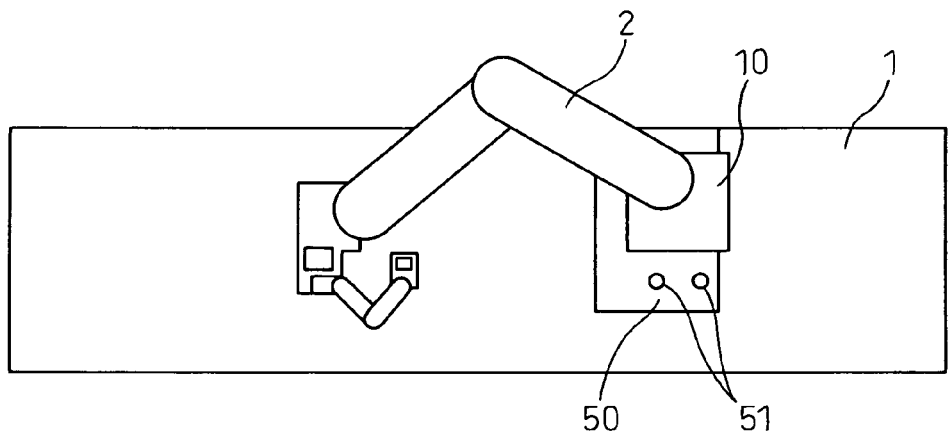
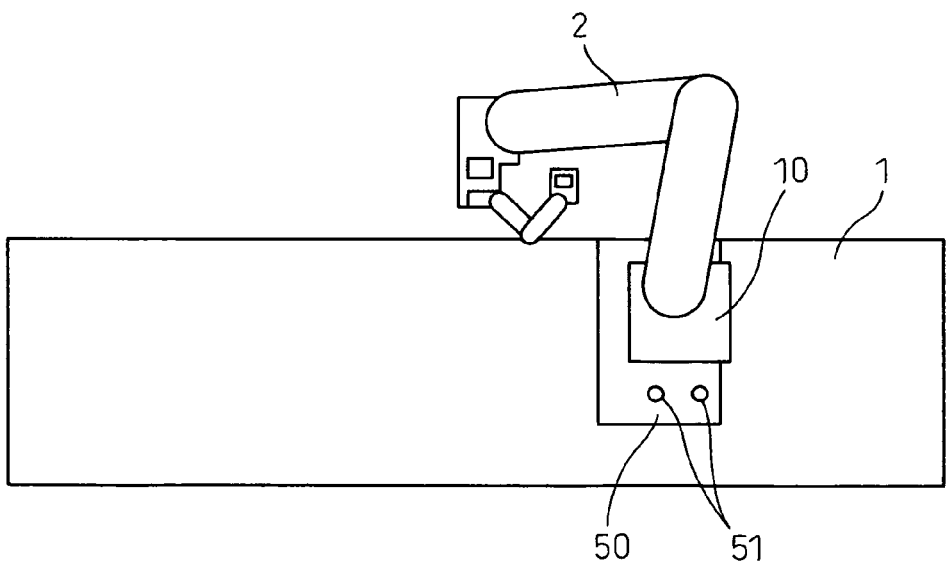

MOLDED COMPONENT RETRIEVING APPARATUS AND A MOLDING MACHINE HAVING THE MOLDED COMPONENT RETRIEVING APPARATUS MOUNTED THEREON

BACKGROUND OF THE INVENTION

1. Field of the Invention

The present invention relates to a molded component retrieving apparatus, intended to retrieve a molded component from a molding machine, and to a molding machine having the molded component retrieving apparatus mounted thereon.

2. Description of the Related Art

A molded component retrieving apparatus is arranged with a molding machine to retrieve a molded component and the runner remaining in an opened die after the molded component is molded in the molding machine. Generally, this molded component retrieving apparatus is of orthogonal coordinate type having a combination of linear axes.

FIG. 13 shows an example of the orthogonal coordinate retrieving apparatus. A base 101 of the orthogonal coordinate retrieving apparatus 100 is mounted on the molding machine 1. The base 101 includes a guide means for guiding a movable member 102 adapted to move in the direction (X axis) orthogonal to the longitudinal direction of the molding machine 1. The movable member 102 has mounted thereon a molded component retrieving mechanism 103 and a runner retrieving mechanism 104 movably along the direction (Y axis) orthogonal to the direction (X axis) in which the movable member moves. The molded component retrieving mechanism 103 and the runner retrieving mechanism 104 respectively include a molded component holding means 105 and a runner holding means 106 such as a hand or an adsorber mounted at the forward end thereof. The molded component holding means 105 and the runner holding means 106 are adapted to be driven in the direction (Z axis) orthogonal to the X and Y axes. With this configuration, the molded component holding means 105 and the runner holding means 106 can move in the directions of the X, Y and Z axes, orthogonal to each other, to hold and retrieve the molded component and the runner from the opened die.

Instead of the orthogonal coordinate retrieving apparatus, a molded component retrieving apparatus configured of a multi-joint robot has been developed (Japanese Unexamined Patent Publication Nos. 10-95028 and 9-201849) to retrieve the molded component from the opened die. FIG. 14 shows an example of a vertical multi-joint robot configured as a molded component retrieving apparatus according to the prior art.

A base 201 of a molded component retrieving apparatus 200 is fixed on a fixed pedestal 208 of the molding machine 1. A linear shaft 202 is adapted to move in the direction perpendicular to the page along the base 201. This linear shaft has, at the forward end thereof, a wrist shaft 205 and two arms 203, 204 operated in the plane parallel to the page. A hand 206 constituting a molded component holding means is mounted on the wrist shaft 205. The hand 206 is driven vertically against the surface of the attached sheet by the linear shaft and horizontally and vertically against the surface of the attached sheet by the collaborative operation of the two arms 203, 204. The molded component remaining in the die 207 mounted on the fixed pedestal 208 and a movable pedestal 209 and opened is retrieved by being held in the hand 206.

In the orthogonal coordinate retrieving apparatus described above, the molded component holding means and the runner holding means, such as hands, are required to be moved in vertical direction (Z axis), and therefore require a guide unit. When mounting the retrieving apparatus on the molding machine, therefore, the problem is posed that the total height is increased so that the retrieving apparatus cannot be mounted on the molding machine in a place having a low ceiling.

In view of the fact that the hand or the like is moved also in the direction (along X axis in FIG. 13) orthogonal to the longitudinal direction of the molding machine, a guide member to move the hand projects considerably, sideways, out of the molding machine. It is therefore difficult to transport the molding machine with the retrieving apparatus mounted thereon, and the molding machine and the retrieving apparatus are required to be transported separately from each other, thereby posing the problem of an increased transportation cost and installation labor.

Further, the linear shaft to drive the movable unit linearly has many component parts, the cost of each of which is comparatively high, and therefore it is difficult to reduce the product cost.

To extend the stroke of linear movement, an additional linear shaft unit is required as a replacement.

Specifically, the runner holding means and the runner retrieving mechanism (vertical shaft for the runner) cannot be easily mounted subsequently as an attachment. It is therefore necessary to purchase the molding machine originally equipped with the capability to retrieve the runner. This causes an ineffectiveness and an increased cost. Also, as shown in FIG. 15, the molded component retrieving mechanism 103 and the runner retrieving mechanism 104 are often mounted together on a guide rail 102a of the movable member 102, and therefore it is difficult to remove only one of them.

As described above, the orthogonal coordinate retrieving apparatus encounters various problems. In the molded component retrieving apparatus configured of a multi-joint robot, on the other hand, the wrist at the forward end of the robot is so large that it cannot be inserted into the opened die, and a long hand or the like is required to permit insertion in the die. Even after that, the wrist is difficult to insert into, and difficult to handle in, a narrow space. Also, the retrieving apparatus is often mounted on the upper part such as the fixed pedestal of the molding machine, and each arm of the robot constituting the conventional retrieving apparatus and adapted to swivel in a vertical plane cannot be easily installed in an place having a low ceiling.

Accordingly, it is an object of this invention to provide a molded component retrieving apparatus which can be mounted on a molding machine even in a place having a low ceiling and which can be transported while being mounted on the molding machine.

SUMMARY OF THE INVENTION

According to a first aspect of the invention, there is provided a molded component retrieving apparatus mounted on a molding machine, to retrieve a molded component when the die of the molding machine opens, comprising: a base fixed on the molding machine; a first arm with a first end thereof mounted pivotably around a first shaft perpendicular to the base; a second arm with a first end thereof mounted at a second end of the first arm pivotably around a second shaft parallel to the first shaft; a third arm with a first end thereof mounted at a second end of the second arm pivotably around a third shaft parallel to the second shaft; and a first lift arm having a first holding means at the forward end thereof and adapted to move up and down with respect to the third arm. In this aspect of the invention, the height and width of the apparatus are reduced.

According to a second aspect of the invention, there is provided a molded component retrieving apparatus, further comprising: an intermediate base member fixed on the third arm; a fourth arm with a first end thereof mounted on the intermediate base member pivotably around a fourth shaft parallel to the third shaft; a fifth arm with a first end thereof mounted at a second end of the fourth arm pivotably around a fifth shaft parallel to the fourth shaft; a sixth arm with a first end thereof mounted at a second end of the fifth arm pivotably around a sixth shaft parallel to the fifth shaft; and a second lift arm having a second holding means at the forward end thereof and adapted to move up and down with respect to the sixth arm.

According to a third aspect of the invention, there is provided a molded component retrieving apparatus wherein the intermediate base member, the fourth arm, the fifth arm, the sixth arm and the second lift arm constitute a unit removably mounted on the third arm.

According to a fourth aspect of the invention, there is provided a molded component retrieving apparatus further comprising: a fifth pulley fixed on the intermediate base member in such a manner that the center axis thereof is coincident with the fourth shaft; a sixth pulley connected with the fifth pulley by a third belt and fixed on the fifth arm in such a manner that the center axis thereof is coincident with the fifth shaft; a seventh pulley arranged coaxially with the sixth pulley and fixed on the fourth arm; an eighth pulley connected with the seventh pulley by a fourth belt and fixed on the sixth arm in such a manner that the center axis thereof is coincident with the sixth shaft; and a fourth arm drive means arranged at a position in opposed relation with the fifth pulley substantially in the neighborhood of the fourth shaft; wherein the ratio of the diameter of the fifth pulley to the diameter of the sixth pulley is 2 to 1, the ratio of the diameter of the seventh pulley to the diameter of the eighth pulley is 1 to 2, and the fourth arm and the fifth arm each have a joint of the same length. In this aspect of the invention, the sixth arm can be moved linearly without changing the position thereof.

According to a fifth aspect of the invention, there is provided a molded component retrieving apparatus further comprising: a first pulley fixed on the base in such a manner that the center axis thereof is coincident with the first shaft; a second pulley connected with the first pulley by a first belt and mounted rotatably on the first arm in such a manner that the center axis thereof is coincident with the second shaft; a third pulley configured to rotate coaxially and integrally with the second pulley; a fourth pulley connected with the third pulley by a second belt and fixed with the third arm in such a manner that the center axis thereof is coincident with the third shaft; a first arm drive means arranged at a position in opposed relation with the first pulley substantially in the neighborhood of the first shaft; and a second arm drive means arranged at a position in opposed relation with the second and third pulleys substantially in the neighborhood of the second shaft; wherein the first pulley and the second pulley have the same diameter, and the third pulley and the fourth pulley have the same diameter. In this aspect of the invention, the third arm can be moved while holding the position thereof.

According to a sixth aspect of the invention, there is provided a molded component retrieving apparatus, wherein the first pulley, the second pulley, the third pulley and the fourth pulley have a hollow portion, and at least a selected one of a cable and a hose is passed through the hollow portions of the first pulley, the second pulley, the third pulley and the fourth pulley.

According to a seventh aspect of the invention, there is provided a molded component retrieving apparatus, wherein also the first arm, the second arm and the third arm have a hollow portion, and at least selected one of a cable and a hose is passed through the hollow portions of each of the first arm, the second arm and the third arm.

According to an eighth aspect of the invention, there is provided a molded component retrieving apparatus, wherein the fifth pulley, the sixth pulley and the seventh pulley have a hollow portion, and at least a selected one of a cable and a hose is passed through the hollow portions of the fifth pulley, the sixth pulley and the seventh pulley.

According to a ninth aspect of the invention, there is provided a molded component retrieving apparatus, wherein also the fourth arm, the fifth arm and the sixth arm have a hollow portion, and at least selected one of a cable and a hose is passed through the hollow portions of the fourth arm, the fifth arm and the sixth arum.

According to a tenth aspect of the invention, there is provided a molded component retrieving apparatus further comprising a mounting position changing means mounted on the base whereby the position at which the base is fixedly mounted is displaced in the direction perpendicular to the length of the molding machine.

According to an 11th aspect of the invention, there is provided a molding machine having mounted thereon the molded component retrieving apparatus according to any one of the first to tenth aspects.

The molded component retrieving apparatus according to this invention has a low height, and therefore can be mounted on the upper part of the molding machine even in a place having a low ceiling. Also, the apparatus according to the invention can be configured to have a narrow width, and therefore can be accommodated within the width of the molding machine. Thus, the apparatus can be transported while being mounted on the molding machine. Further, in the molded component retrieving apparatus, the operation area can be easily changed and the runner retrieving means can be removed easily.

These and other objects, features and advantages of the present invention will be more apparent in light of the detailed description of exemplary embodiments thereof as illustrated by the drawings.

BRIEF DESCRIPTION OF THE DRAWINGS

FIG. 4 is a diagram showing the configuration of the first unit of the molded component retrieving apparatus according to the same embodiment.

FIG. 5 is a diagram showing the configuration of the second unit of the molded component retrieving apparatus according to the same embodiment.

FIG. 11a is a plan view showing the operation of the molded component retrieving apparatus mounted at a reference position on the molding machine using an adaptor plate.

FIG. 11b is a plan view showing the operation of the molded component retrieving apparatus mounted at a reference position on the molding machine using an adaptor plate.

DETAILED DESCRIPTION

An embodiment of the invention will be explained below with reference to the accompanying drawings.

Figure 1:
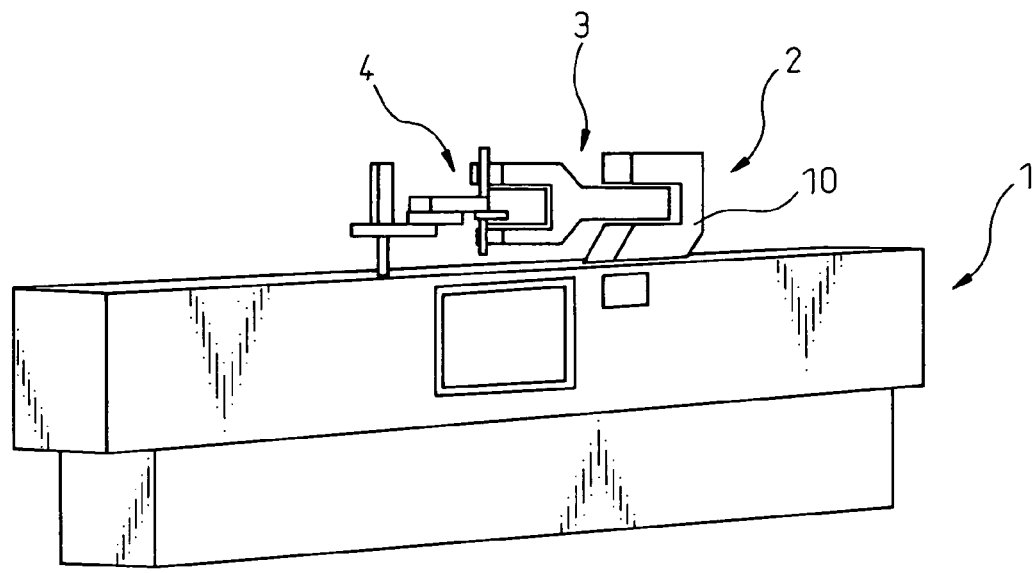
FIG. 1 is a perspective view showing a molding machine having a molded component retrieving apparatus mounted thereon according to an embodiment of the invention.

FIG. 1 is a perspective view schematically showing a molded component retrieving apparatus 2 mounted on the upper part of a molding machine 1 according to an embodiment of the invention. The molded component retrieving apparatus 2 is mounted at the upper part of the molding machine 1 such as at a fixed pedestal of the molding machine 1. The molded component retrieving apparatus 2 according to this embodiment is configured of a first unit 3 for driving a first lift arm and a second unit 4 mounted removably at the forward end of the first unit 3.

Figure 2:
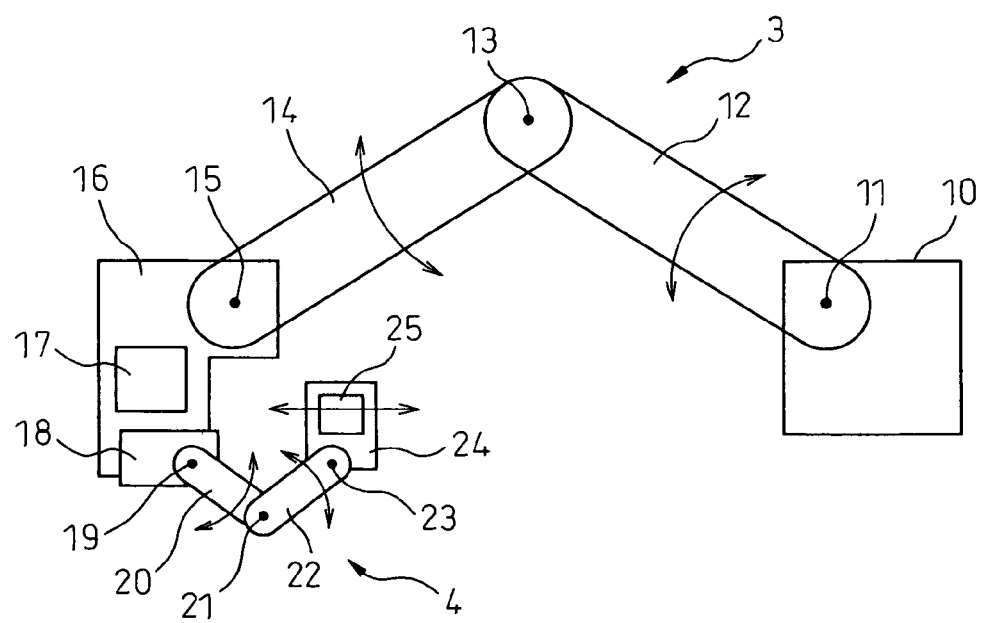
FIG. 2 is a diagram for explaining the link structure of the molded component retrieving apparatus according to the same embodiment.

FIG. 2 is a diagram for explaining the arm configuration of the molded component retrieving apparatus 2. The molded component retrieving apparatus 2 is mounted on the molding machine 1 via a base 10. A first end of a first arm 12 is mounted pivotably around a first shaft 11 in the direction perpendicular to the base 10, on the base 10. A first end of a second arm 14 is mounted pivotably around a second shaft 13 parallel to the first shaft 11 on the second end of the first arm 12. A first end of a third arm 16 is mounted pivotably around a third shaft 15 parallel to the second shaft on the second end of the second arm 14. A first lift arm 17 adapted to move in axial direction parallel to the third shaft 15 is mounted on the third arm 16.

The base 10, the first shaft 11, the first arm 12, the second shaft 13, the second arm 14, the third shaft 15, the third arm 16 and the first lift arm 17 described above make up a first unit 3. Further, an intermediate base member 18 is mounted removably with a screw or the like on the third arm 16 which is the forward end of the first unit 3. A first end of the fourth arm 20 is mounted pivotably around the fourth shaft 19 parallel to the third shaft 15 on the intermediate base member 18. A first end of the fifth arm 22 is mounted pivotably around the fifth shaft 21 parallel to the fourth shaft on the second end of the fourth arm 20. Further, a sixth arm 24 is mounted pivotably around the sixth shaft 23 parallel to the fifth shaft 21 on the second end of the fifth arm 22, and the sixth arm 24 has a second lift arm 25 mounted thereon and adapted to move in the direction parallel to the axial direction of the sixth shaft 23. The intermediate base member 18, the fourth shaft 19, the fourth arm 20, the fifth shaft 21, the fifth arm 22, the sixth shaft 23, the sixth arm 24 and the second lift arm 25 make up a second unit 4.

Figure 3:
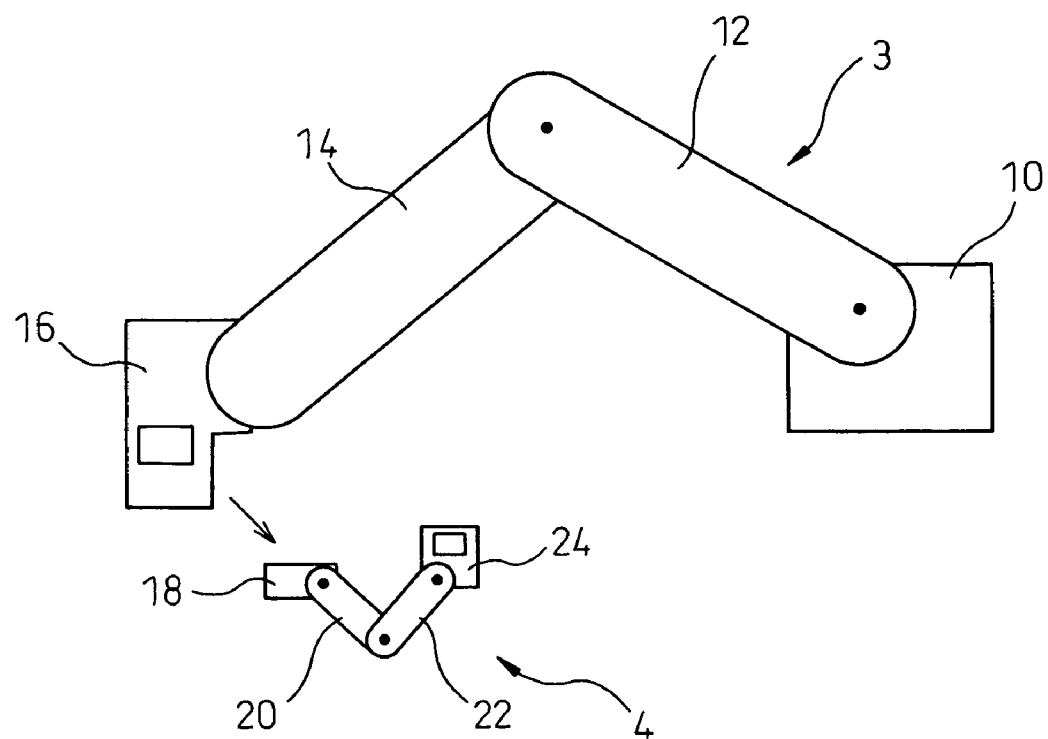
FIG. 3 is a diagram for explaining the separation of a second unit from a first unit of the molded component retrieving apparatus according to the same embodiment.

FIG. 3 is a diagram for explaining the separation of the first unit 3 and the second unit 4 from each other. The intermediate base member 18 is removed from or mounted on the third arm 16 to separate or connect the first unit 3 and the second unit 4 from each other or to each other, respectively. For example, the first unit 3 makes up a molded component retrieving means, and the second unit 4 makes up a runner retrieving means, so that the second unit 4 is removed or mounted as required.

The first to sixth arms 12, 14, 16, 20, 22 and 24 of this arm mechanism pivot around the each axes which are directed to the same axial direction. Once the base 10 is mounted at the upper part of the molding machine, for example, the first to sixth arms pivot on a horizontal plane around a vertical axis, while only the first and second lift arms 17, 25 move in vertical direction. As shown in FIG. 1, therefore, the molded component retrieving apparatus 2 according to this embodiment, even if mounted at the upper part of the molding machine 1, can be reduced in total height as compared with the conventional molded component retrieving apparatus.

FIG. 4 is a diagram showing a configuration of the first unit 3.

The first end of the first arm 12 is pivotably supported on the base 10 in such a manner the first end is caught in the hollow portion of the base 10. The first arm 12, pivotably mounted around the first shaft 11, is pivoted around the first shaft 11 by a first arm drive means 26 configured of a motor and a reduction gear or the like. At a position in opposed relation with the first arm drive means 26, a pulley 27 having a through hole is fixed on the base 10 and projected inside into the hollow portion of first arm 12.

A second pulley 28 is mounted rotatably around the second shaft 13 inside the second end of the first arm 12. A third pulley 29 is mounted integrally with the second pulley 28 and the pulleys 28, 29 are formed as a hollow structure having a through hole. The second pulley 28 is mounted to locate in the first arm 12 and the third pulley 29 is mounted to locate in the second arm 14. A first belt 30 is suspended between the first pulley 27 and the second pulley 28.

The second arm 14 has the first end thereof pivotably supported around the second shaft 13 arranged at the forward end of the first arm 12. The second arm 12 is adapted to pivot around the second shaft 13 by a second arm drive means 31 configured of a motor, a pulley, a belt, etc. in the hollow structure of the first arm 12. This second arm 14 is also configured as a hollow structure in such a manner that the third pulley 29 integrated with the second pulley 28 is arranged in the hollow portion of the second arm 14. At the second end of the second arm 14, a fourth pulley 32 fixed on the third arm 16 is rotatably supported around the third shaft 15 on the second arm 14. The fourth pulley 32 is a hollow structure having a through hole and is arranged in the hollow portion of the second arm 14. A second belt 33 is suspended between the fourth pulley 32 and the third pulley 29.

The third arm 16 is also constructed as a hollow structure. The first lift arm 17 is mounted at the forward end of the third arm 16. The first lift arm 17 is driven by the first lift arm drive means 34 including a motor and a reduction gear and is moved in vertical direction (upward and downward in the page). A first holding means 35 including a hand or an adsorber for holding the molded component or the runner is arranged at the forward end of the first lift arm 17.

A cable and a hose or the like to supply a signal or a driving force such as electrical power or air to drive the first and second arm drive means 26, 31, the first lift arm drive means 34 and the first holding means 35 are connected to rejective drive means through the hollow portion of the base 10, the first, second, third and fourth pulleys and the first, second and third arms having a hollow structure. In the case where the arms are not configured as a hollow structure, the cable and the hose are laid along the side surfaces or the like of the arms through the hollow portion of each pulley. The first to fourth pulleys may have exactly the same diameter, or at least the first pulley 27 and the second pulley 28 have the same diameter, and at least the third pulley 29 and the fourth pulley 32 have the same diameter.

FIG. 5 is a diagram showing a configuration of the second unit 4.

The intermediate base member 18 mounted on the third arm 16 also has a hollow structure, and has therein a fourth arm drive means 40 to pivot the fourth arm 20 around the fourth shaft 19. The fifth pulley 41 having the fourth shaft 10 as the center axis is fixed at a position in opposed relation with the fourth arm drive means 40 of the intermediate base member 18, in the intermediate member 18. This fifth pulley 41 is also a hollow structure having a through hole and is projected into the hollow portion of the fourth arm 20. A sixth pulley 42 is supported rotatably around the fifth shaft 21 on the fourth arm 20 at the second end of the fourth arm 20, while at the same time being fixed on the fifth arm 22. The sixth pulley 42 has a through hole, through which the hollow shaft 43a of a seventh pulley 43 is passed and fixed at the forward end thereof by the fixing member 44 arranged on the fourth arm 20. The seventh pulley 43 is arranged in the hollow portion of the fifth arm 22. Specifically, the center axis of the seventh pulley 43 coincides with the fifth shaft 21 and is aligned with the sixth pulley 42. The third belt 45 is suspended between the fifth pulley 41 and the sixth pulley 42.

An eighth pulley 46 is rotatably supported on the fifth arm at the second end of the fifth arm 22 while at the same time being fixed at the first end of the sixth arm 24. The seventh pulley 43 and the eighth pulley 46 are arranged in the hollow portion of the fifth arm 22 and a fourth belt 47 is suspended between the seventh pulley 43 and the eighth pulley 46.

The sixth arm 24 also has a hollow structure, and the second lift arm 25 is mounted at the second end thereof. The second lift arm 25 is driven by the second lift arm drive means 48 including a motor and a reduction gear and adapted to move in vertical direction (upward and downward in the drawing). The second lift arm 25 has a second holding means 49 such as a hand at the forward end thereof.

The cables and hoses to supply signals and drive force such as electrical power and air to the drive means 40, 48 and the second holding means 49 are connected to respective drive means through the hollow portion of the intermediate base member 18, the fifth pulley 41, the fourth arm 20, the seventh pulley 43, the fifth arm 22, the eighth pulley 46 and the sixth arm 24 having a hollow structure. In the case where none of the arms has a hollow structure, the cables and hoses are laid along the side surfaces or the like of the arms through the hollow portion of the pulleys. The ratio of the diameter of the fifth pulley 41 to that of the sixth pulley 42 is set to 2 to 1, and the ratio of the diameter of the seventh pulley 43 to that of the eighth pulley 46 to 1 to 2. The fourth arm 20 and the fifth arm 22 have the same joint length. In other words, the distance between the fourth shaft 19 and the fifth shaft 21 is equal to the distance between the fifth shaft 21 and the sixth shaft 23.

Next, the operation of the molded component retrieving apparatus according to this embodiment is explained.

Figure 6A:
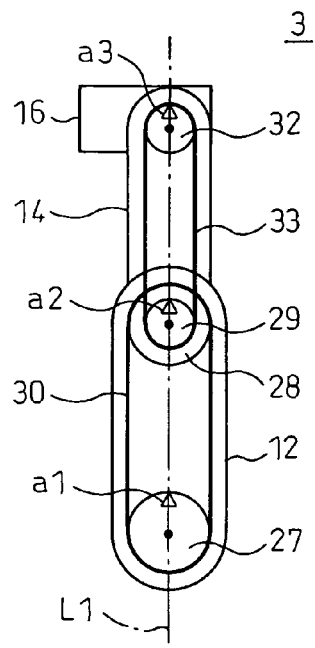
FIG. 6a is a diagram for explaining the operation of the first unit of the molded component retrieving apparatus according to the same embodiment.

First, the operation of the first unit 3 is explained. FIGS. 6a to 6d are diagrams for explaining the operation of the first unit 3. As shown in FIG. 6a, if the center axes of the first arm 12 and the second arm 14 are aligned on line L1, the triangular marks a1, a2, a3 are attached at predetermined positions of the first, second (third) and fourth pulleys to indicate the position of rotation of each of the first, second (third) and fourth pulleys, respectively. To facilitate understanding, the second pulley 28 and the third pulley 29 are shown to have different diameters in FIG. 6.

Figure 6B:
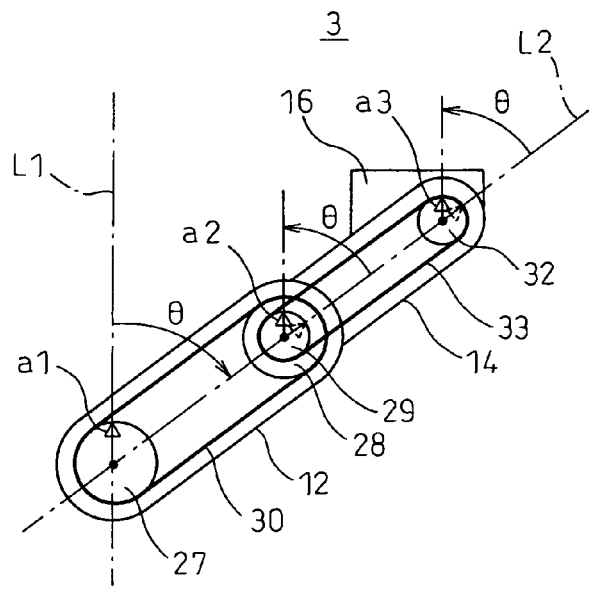
FIG. 6b is a diagram for explaining the operation of the first unit of the molded component retrieving apparatus according to the same embodiment.

In FIG. 6a, if the first arm 12 is pivoted by angle θ by the first arm drive means 26, this state being shown in FIG. 6b, the center line L1 turns to L2. The first pulley 27 is fixed on the base and, therefore, is not rotated. In view of the fact that the first arm 12 on which the second pulley 28 is rotatably mounted is pivoted by angle θ and that the first belt 30 is suspended between the second pulley 28 and the first pulley 27 fixed on the base 10 and the first pulley 27 and the second pulley 28 have the same diameter, then, the second pulley 28 is rotated by angle θ in reverse direction relatively to the first arm 12. The third pulley 29 integrated with the second pulley 28 is also rotated by angle θ. The third pulley 29 and the fourth pulley 32 on which the second belt 33 is suspended are also rotated. In this case, the angle of rotation is also θ due to the fact that the diameter of the third pulley 29 is equal to that of the fourth pulley 32. As the fourth pulley 32 is rotated by angle θ, the third arm 16 fixed on the fourth pulley 32 also pivots by angle θ. As shown in FIG. 6b, therefore, in spite of the pivoting of the first arm 12, the third arm 16 is pivoted by the same angle of pivoting in the opposite direction, thus, the position of the third arm 16 remains unchanged, and the third arm 16 always points in the same predetermined direction.

Next, the operation of activating the second arm drive means 31 and pivoting the second arm 14 is explained with reference to FIGS. 6c, 6d.

Figure 6C:
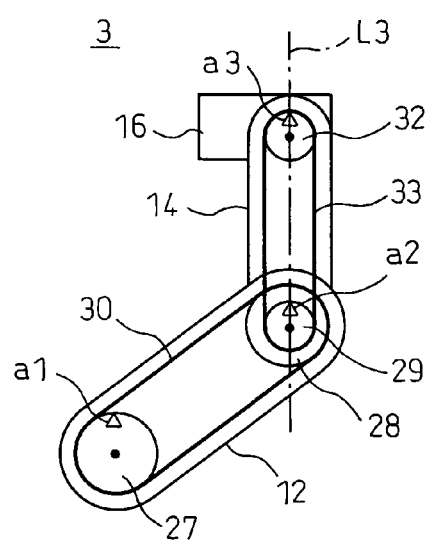
FIG. 6c is a diagram for explaining the operation of the first unit of the molded component retrieving apparatus according to the same embodiment.
Figure 6D:
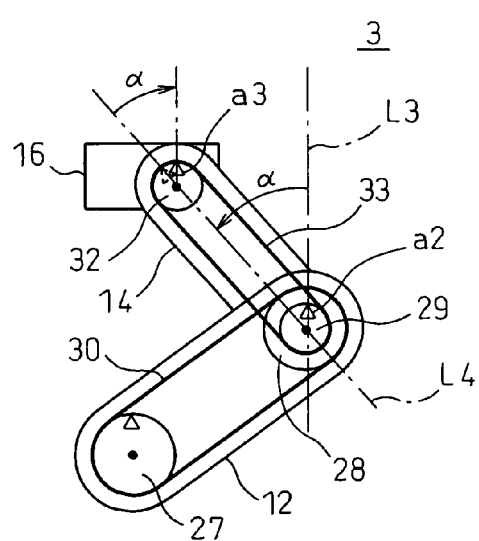
FIG. 6d is a diagram for explaining the operation of the first unit of the molded component retrieving apparatus according to the same embodiment.

If, from the state of FIG. 6c (the center line of the second arm 14 is assumed to be L3), the second arm 14 is pivoted by angle α counterclockwise by the second arm drive means 31, the center line L3 turns to L4. The third pulley 29 integrated with the second pulley 28 is not rotated (no relative rotation with the first arm occurs) because the first arm 12 is not pivoted and the first pulley 27 is not rotated. In view of the fact that the second belt 33 is suspended between the fourth pulley 32 and the third pulley 29, on the other hand, the fourth pulley 32 rotates in reverse direction relatively with the pivoting of the second arm 14. The third pulley 29 and the fourth pulley 32 have the same diameter, and therefore the fourth pulley 32 is rotated in opposite direction by the same angle α of rotation which is equal to the angle of pivoting of the second arm 14. As a result, the third arm 16 fixed on the fourth pulley 32 is pivoted in opposite direction by the same amount as the second arm 14. As shown in FIG. 6d, the position of the third arm 16 is the same that of the second arm 14 before the rotation thereof in FIG. 6c.

Even in the case where the first arm 12 and the second arm 14 are pivoted at the same time to superpose their pivoting, therefore, the position of the third arm 16 remains unchanged and the third arm 16 always points in the same predetermined direction. Specifically, the first holding means 35 such as a hand mounted at the forward end of the first lift arm 17 arranged on the third arm 16 always points in the same predetermined direction, and thus can always hold a predetermined position against the surface of the opened die. Also, the first arm 12 pivots around the first shaft 11, and the second arm 14 pivots around the second shaft 13. Therefore, the third arm 16 (and the first lift arm 17) mounted at the forward end of the second arm 14 can be arbitrarily moved linearly and arcuately in a horizontal plane.

Next, the operation of the second unit 4 is explained.

Figure 7A:
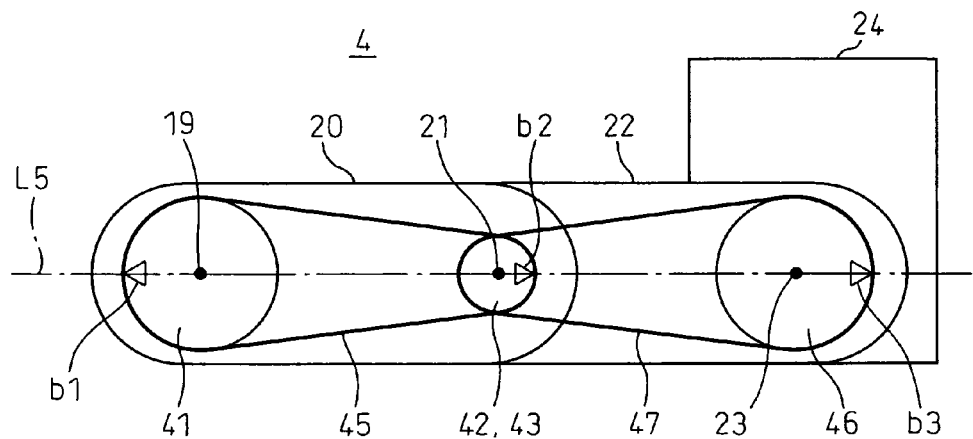
FIG. 7a is a diagram for explaining the operation of the second unit of the molded component retrieving apparatus according to the same embodiment.
Figure 7B:
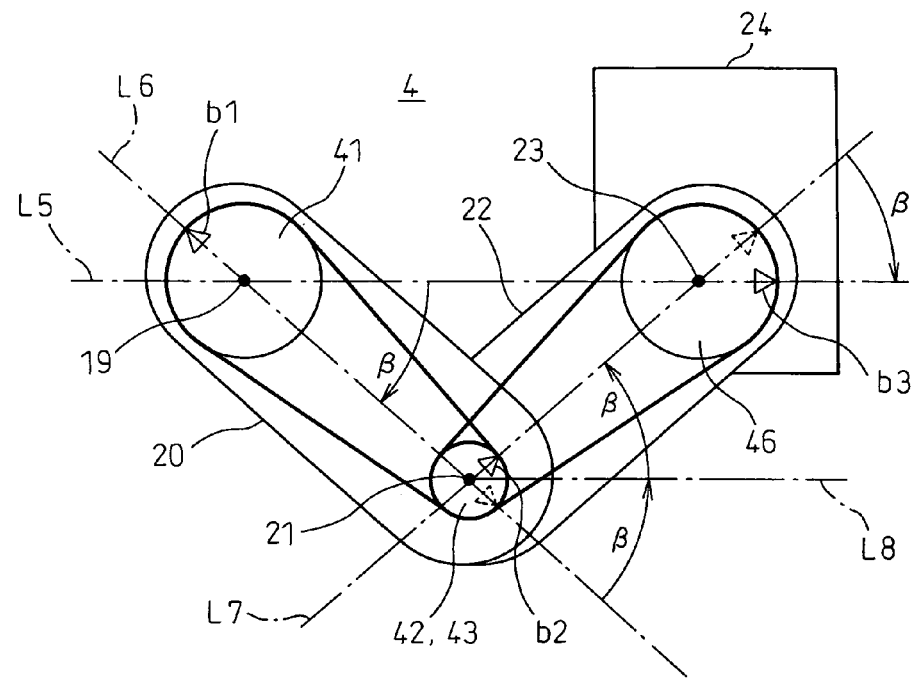
FIG. 7b is a diagram for explaining the operation of the second unit of the molded component retrieving apparatus according to the same embodiment.

FIGS. 7a, 7b are diagrams for explaining the operation of the second unit 4. In FIGS. 7a, 7b, triangular marks b1 to b3 are attached at predetermined positions of the pulleys to indicate the pulley rotation. As shown in FIG. 7a, the fifth shaft 21 is located on the straight line L5 connecting the centers of the fourth shaft 19 and the sixth shaft 23. From the state in which the fourth arm 20 and the fifth arm 22 have the center axes on the same line, as shown in FIG. 7b, the fourth arm 20 is pivoted by angle β clockwise by the fourth arm drive means 40, in the process, the straight line 16 connects the fourth shaft 19 and the fifth shaft 21. The fifth pulley 41 is fixed on the intermediate base member 18 and, therefore, is not rotated. The sixth pulley 42 on which the third belt 45 is suspended with the fifth pulley 41, however, is relatively rotated by the pivoting of the fourth arm 20. As the ratio of the diameter of the fifth pulley 41 to that of the sixth pulley 42 is 2 to 1, the sixth pulley 42 rotates by a double amount of rotation in opposite direction. Thus, the sixth pulley 42 is rotated by angle 2β in opposite direction. The fifth arm 22, which is fixed on the sixth pulley 42, is moved with the sixth pulley 42 on the one hand and pivots by angle 2β with the rotation of the sixth pulley 42 by angle 2β on the other hand. The straight line L7 connecting the fifth shaft 21 and the sixth shaft 23 is directed to the direction in which the straight line L6 connecting the fourth shaft 19 and the fifth shaft 21 is pivoted by angle 2β counterclockwise.

Although the seventh pulley 43 fixed on the fourth arm 20 is not rotated around the fifth shaft 21, the fifth arm 22 rotates around the fifth shaft 12 by angle 2β. Therefore, the seventh pulley 43 and the eighth pulley 46 on which the fourth belt 47 is suspended rotate relatively in the opposite direction to the pivoting direction of the fifth arm 22. In the process, the ratio of the diameter of the seventh pulley 43 to that of the eighth pulley 46 is 1 to 2 and, therefore, the eighth pulley 46 rotates in opposite direction (clockwise) by angle β. Thus, the position of the sixth arm 24 fixed on the eighth pulley 46 remains unchanged.

In the state shown in FIG. 7a, the sixth arm 24 is in a predetermined position relative to the straight line L5. As shown in FIG. 7b, when the fourth arm 20 pivots by angle β clockwise, the straight line L6 connecting the fourth shaft 19 and the fifth shaft 21 is pivoted by angle β clockwise from the position of the straight line L5. Unless the fifth arm 22 is pivoted, therefore, the position of the sixth arm 24 with respect to the straight line L5 is equal to that of the sixth arm 24 with respect to the straight line L6, thus, the sixth arm 24 assumes the position pivoted by angle β clockwise with respect to the straight line L5. Actually, however, the fifth arm 22 pivots by angle 2β counterclockwise and, therefore, the sixth arm 24 pivots by angle β clockwise and by angle 2β counterclockwise, namely, the sixth arm 24 pivots a total of angle β in counterclockwise direction. As the eighth pulley 46 rotates by angle β clockwise, however, the sixth arm 24 holds the same position as in FIG. 7a.

In FIG. 7b, on the other hand, the straight line L6 and the straight line L7 form an angle 2β to each other as described above. When drawing a straight line L8 parallel to the original straight line L5, as an auxiliary line, through the center of the fifth shaft 21, the auxiliary line L8 divides the angle 2β into two equal parts. Specifically, the straight line L7 connecting the fifth shaft 21 and the sixth shaft 23 intersects the straight line L5 at an angle β. In addition, the fourth arm 20 and the fifth arm 22 have the same joint length (the distance between the fourth shaft 19 and the fifth shaft 21 is the same as the distance between the fifth shaft 21 and the sixth shaft 23). Therefore, the center of the sixth shaft 23 is located at the same distance from the center of the fifth shaft 21 on the straight line L7 as the length of the fourth arm 20 (distance between the fourth shaft 19 and the fifth shaft 21). Specifically, the fourth shaft 19, the fifth shaft 21 and the sixth shaft 23 form an equilateral triangle, in which the two equal angles β on the bottom thereof are equal to the angle of pivoting from the straight line L5 shown in FIG. 7a. Therefore, the sixth shaft 23 moves linearly along the straight line L5 shown in FIG. 7a.

Figure 8:
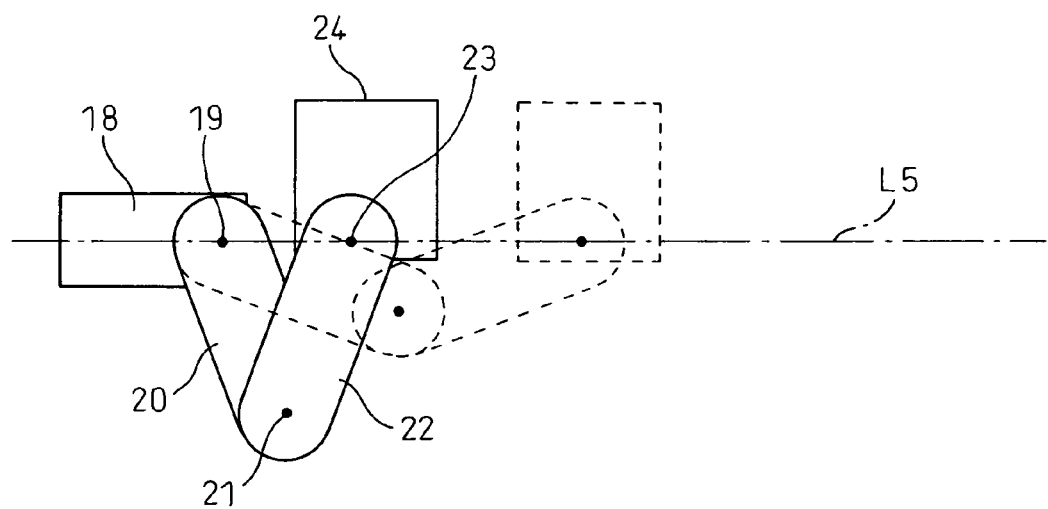
FIG. 8 is a diagram for explaining the linear movement of the sixth arm of the second unit of the molded component retrieving apparatus according to the same embodiment.

FIG. 8 is a diagram for explaining this linear movement. By pivoting the fourth arm 20 around the fourth shaft 19 by the fourth arm drive means 40, the sixth shaft 23 moves along the straight line L5 and the sixth arm 24 moves without changing the position thereof.

According to this embodiment, as described above, the first unit 3 includes three pivoting arms, i.e. the first, second and third arms 12, 14, 16. In spite of this, the first unit 3 has only two arm drive means 26, 31. The molded component retrieving apparatus is intended to retrieve the molded component or the like from an opened die. The first holding means, such as a hand, at the forward end of the first lift arm mounted on the third arm 16 is required to be held in a predetermined position and be moved in a predetermined direction (in the direction of the normal to the die surface, for example) with respect to the die surface from which the molded component or the like is retrieved. Thus, the direction in which the first holding means moves is limited. This indicates a requirement that the position of the holding means such as a hand is held constant while moving. According to this embodiment, therefore, one of the drive means is omitted, while the positions of the first holding means 35 such as a hand and the third arm 16 are kept constantly by the pulley and the belt described above. Of course, the drive means may be provided for each arm to keep the positions of the third arm 16 and the first holding means 35 such as a hand constantly while moving.

In similar fashion, the second unit 4 also may include the drive means to drive the fourth arm 20, the fifth arm 22 and the sixth arm 24 to perform a similar operation to that of the aforementioned embodiment. According to this embodiment, a single drive means can linearly move the sixth arm 24, the second lift arm 25 mounted on the sixth arm 24 and the second holding means 49 such as a hand mounted at the forward end of the second lift arm 25 without changing their positions.

Figure 9A:
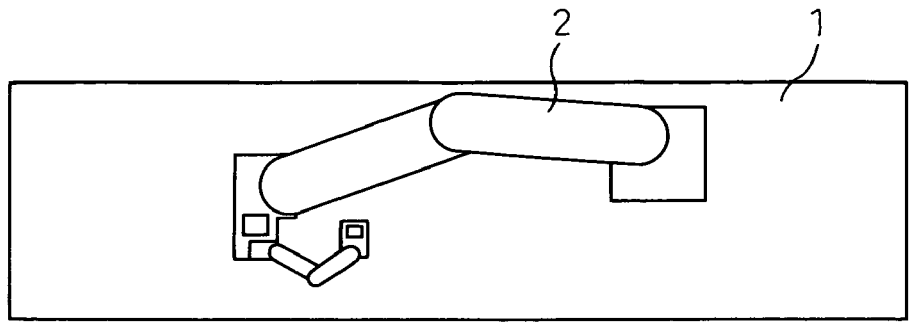
FIG. 9a is a plan view for explaining the operation of the molded component retrieving apparatus mounted on the molding machine according to the same embodiment.
Figure 9B:
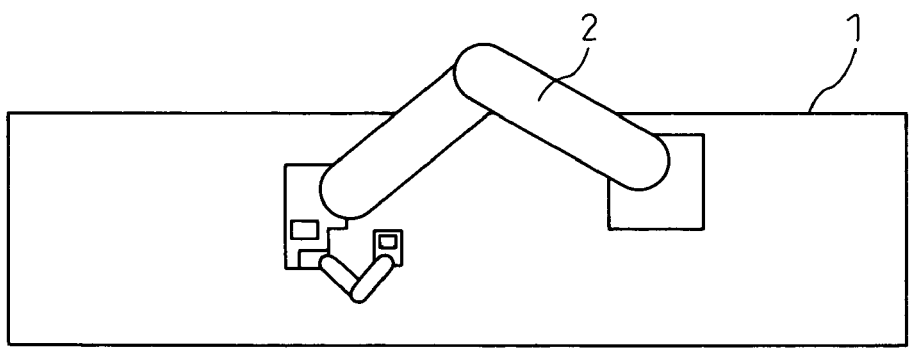
FIG. 9b is a plan view for explaining the operation of the molded component retrieving apparatus mounted on the molding machine according to the same embodiment.
Figure 9C:
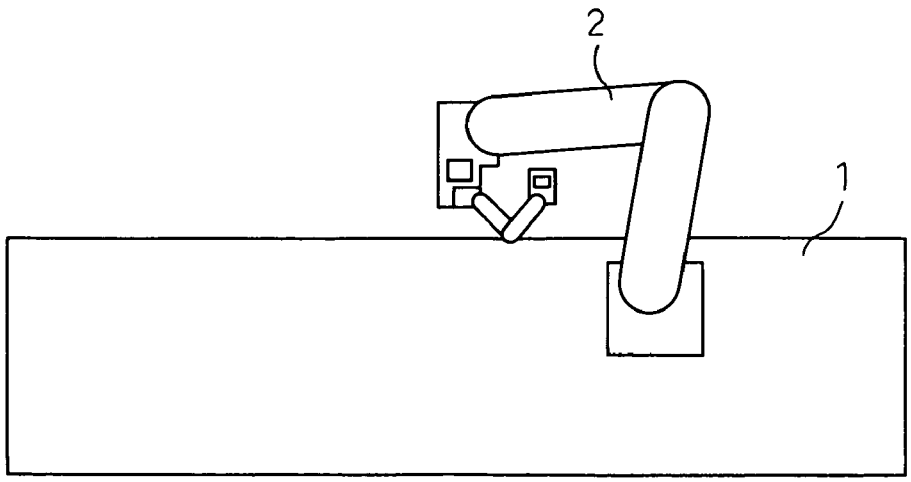
FIG. 9c is a plan view for explaining the operation of the molded component retrieving apparatus mounted on the molding machine according to the same embodiment.
Figure 10:
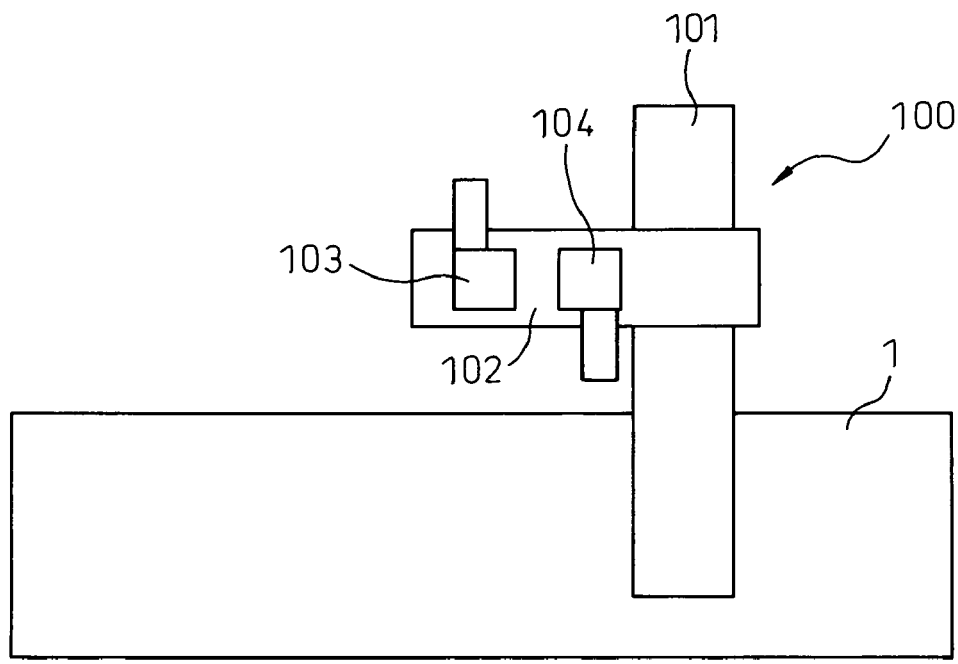
FIG. 10 is a plan view of the conventional retrieving apparatus of orthogonal coordinate type mounted on the molding machine.
Figure 13:
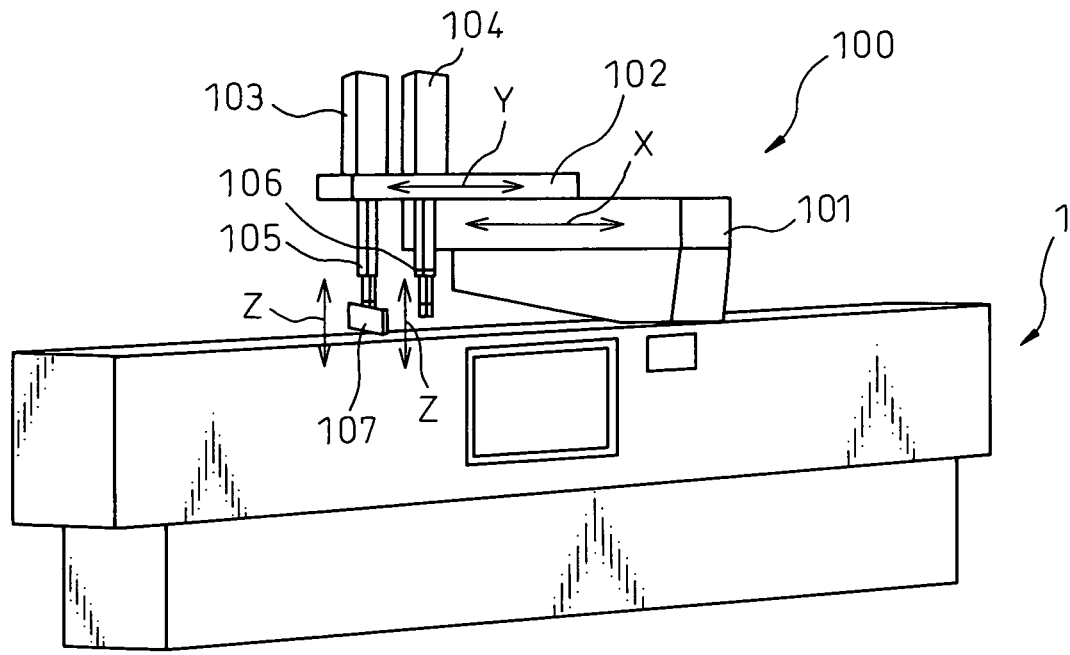
FIG. 13 is a perspective view of the conventional retrieving apparatus of orthogonal coordinate type mounted on the molding machine.
Figure 14:
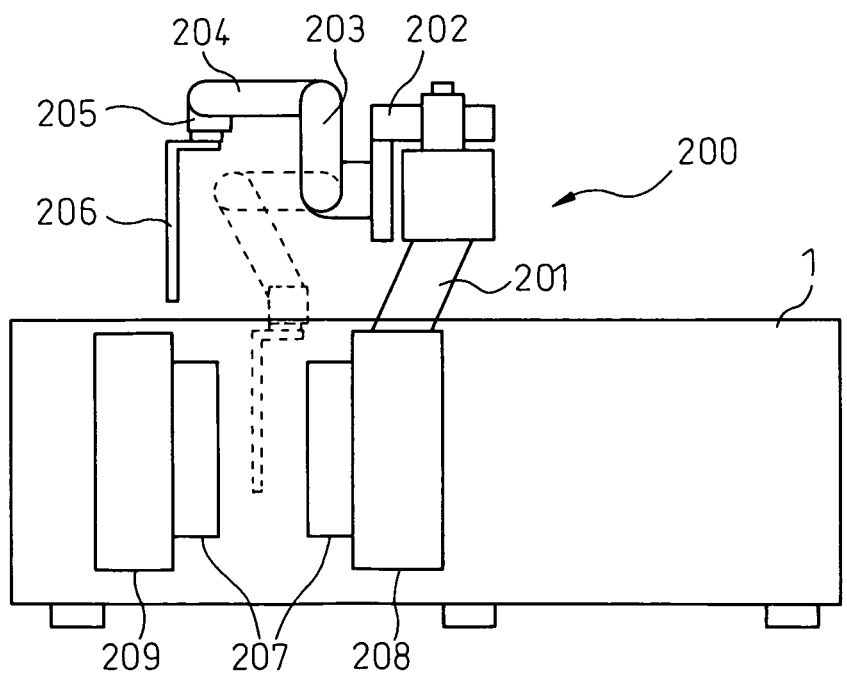
FIG. 14 is a front view showing an example of a vertical multi-joint robot mounted as a molded component retrieving apparatus on the molding machine according to the prior art.
Figure 15:
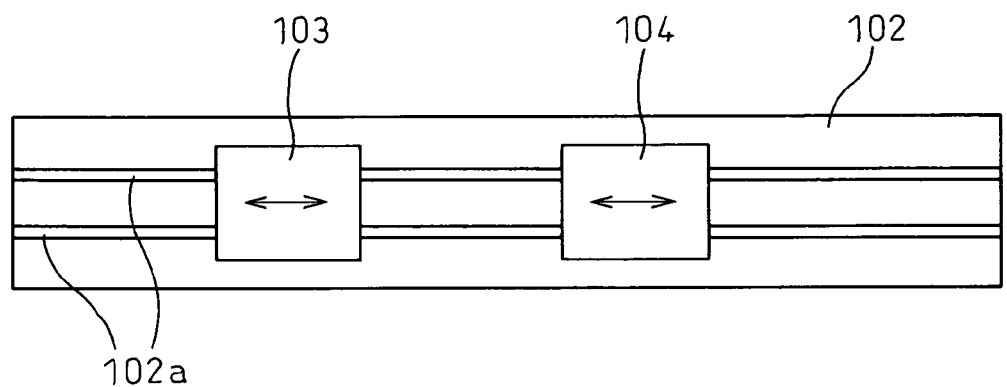
FIG. 15 is a diagram for explaining the manner in which a molded component retrieving mechanism and a runner retrieving mechanism of the conventional retrieving apparatus of orthogonal coordinate type are mounted.

FIGS. 9a to 9c are plan views showing the manner in which the molded component retrieving apparatus 2 according to this embodiment is mounted at the upper part of the molding machine 1 to explain the effects of the invention. FIG. 10 is a plan view showing the orthogonal coordinate retrieving apparatus of FIG. 13 mounted on the molding machine for the purpose of comparison with this embodiment.

As shown in FIG. 9a, the molded component retrieving apparatus 1 according to this embodiment can be mounted at the upper part of the molding machine 1 within the width of the molding machine 1 without being displaced therefrom. Also, in the molded component retrieving apparatus 2, the first to sixth arms pivot around a vertical axis, while only the first and second lift arms to retrieve the molded component and the runner are adapted to move vertically. Thus, the molded component retrieving apparatus of the present invention is not higher than the conventional molded component retrieving apparatus, and therefore the total height of the molding machine, even with the molded component retrieving apparatus 2 mounted thereon, is not high. Therefore, the molding machine 1 can be transported with the molded component retrieving apparatus mounted thereon.

In the conventional retrieving apparatus of orthogonal coordinate type, on the other hand, as shown in FIG. 10, the size thereof is displaced from the width of the molding machine 1, and the provision of a vertically movable member makes it impossible to transport the molding machine with the retrieving apparatus mounted thereon. The molding machine and the retrieving apparatus, therefore, are required to be transported separately from each other and assembled at the place of installation.

FIG. 9b shows the manner in which the molded component is retrieved from the molded component retrieving apparatus 2. FIG. 9c shows the manner in which the molded component is delivered. As understood from FIGS. 9b, 9c, even during the operation of the molded component retrieving apparatus 2, the transverse space occupied is smaller than that of the retrieving apparatus of orthogonal coordinate type shown in FIG. 10.

FIGS. 11a, 11b, 12a, 12b show an example in which the mounting position of the molded component retrieving apparatus 2 on the molding machine 1 is changed based on the position at which the molded component is delivered. Assume that the base 10 of the molded component retrieving apparatus 2 includes an adaptor plate 50 having a plurality of mounting holes 51 as a mounting position changing means. The base having the adaptor plate 50 is mounted on the molding machine 1. In the process, as shown in FIG. 11, the base 10 is mounted at a standard mounting position by suppressing the offset from the center of the molding machine 1 taking the balance to avoid the fall of the molding machine, while in the case where the delivery position of the molded component is far from the molding machine, on the other hand, as shown in FIG. 12, the molded component retrieving apparatus 2 is mounted with as much an offset as required from the center of the molding machine 1.

Figure 12A:
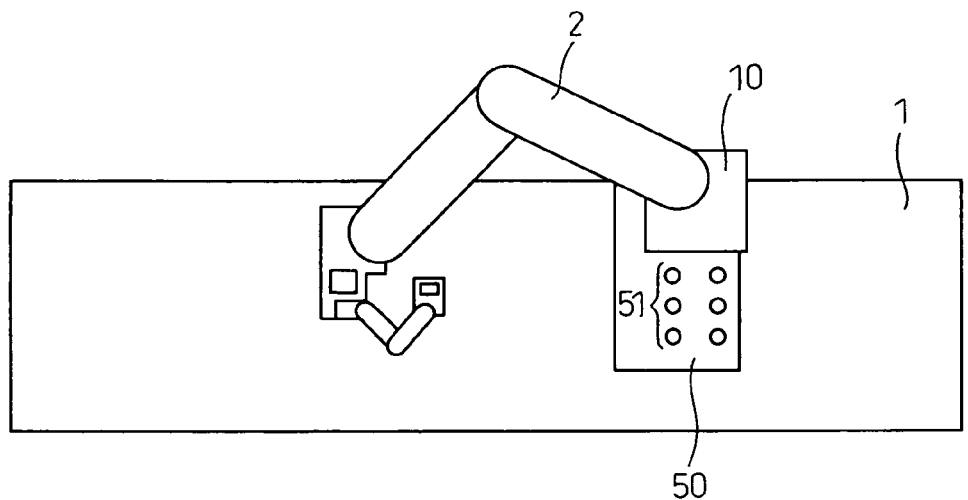
FIG. 12a is a plan view showing the operation of the molded component retrieving apparatus mounted at an offset position on the molding machine using an adaptor plate.
Figure 12B:
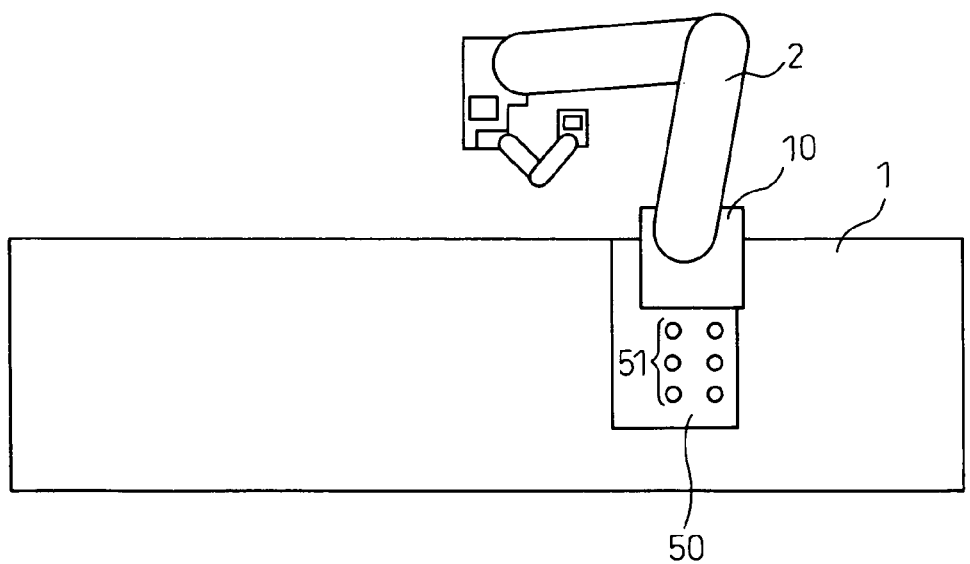
FIG. 12b is a plan view showing the operation of the molded component retrieving apparatus mounted at an offset position on the molding machine using an adaptor plate.

FIGS. 11a, 12a show the state in which the molded component is retrieved from the die, and FIGS. 11b, 12b the state in which the molded component is delivered at the delivery position.

Although the invention has been shown and described with exemplary embodiments thereof, it should be understood by those skilled in the art that the foregoing and various other changes, omissions and additions may be made therein and thereto without departing from the spirit and the scope of the invention.

The invention claimed is:

1. A molded component retrieving apparatus mounted on a molding machine, to retrieve a molded component when the die of the molding machine opens, comprising:
    a base fixed on the molding machine;
    a first arm with a first end thereof mounted pivotally around a first shaft perpendicular to the base;
    a second arm with a first end thereof mounted at a second end of the first arm pivotably around a second shaft parallel to the first shaft;
    a third arm with a first end thereof mounted at a second end of the second arm pivotably around a third shaft parallel to the second shaft;
    a first lift arm having a first holding means at the forward end thereof and adapted to move up and down with respect to the third arm;
    an intermediate base member fixed on the third arm;
    a fourth arm with a first end thereof mounted on the intermediate base member pivotably around a fourth shaft parallel to the third shaft;
    a fifth arm with a first end thereof mounted at a second end of the fourth arm pivotably around a fifth shaft parallel to the fourth shaft;
    a sixth arm with a first end thereof mounted at a second end of the fifth arm pivotably around a sixth shaft parallel to the fifth shaft;
    a second lift arm having a second holding means at the forward thereof and adapted to move up and down with respect to the sixth arm.

2. A molded component retrieving apparatus according to claim 1,
    wherein the intermediate base member, the fourth arm, the fifth arm, the sixth arm and the second lift arm constitute a unit removably mounted on the third arm.

3. A molded component retrieving apparatus according to claim 1, further comprising:
    a fifth pulley fixed on the intermediate base member in such a manner that the center axis thereof is coincident with the fourth shaft;
    a sixth pulley connected with the fifth pulley by a third belt and fixed on the fifth arm in such a manner that the center axis thereof is coincident with the fifth shaft;
    a seventh pulley arranged coaxially with the sixth pulley and fixed on the fourth arm;
    an eighth pulley connected with the seventh pulley by a fourth belt and fixed on the sixth arm in such a manner that the center axis thereof is coincident with the sixth shaft; and
    a fourth arm drive means arranged at a position in opposed relation with the fifth pulley substantially in the neighborhood of the fourth shaft;
    wherein the ratio of the diameter of the fifth pulley to the diameter of the sixth pulley is 2 to 1, the ratio of the diameter of the seventh pulley to the diameter of the eighth pulley is 1 to 2, and the fourth arm and the fifth arm each have a joint of the same length.

4. A molded component retrieving apparatus according to claim 1, further comprising:
    a first pulley fixed on the base in such a manner that the center axis thereof is coincident with the first shaft;

a second pulley connected with the first pulley by a first belt and mounted rotatably on the first arm in such a manner that the center axis thereof is coincident with the second shaft;

a third pulley configured to rotate coaxially and integrally with the second pulley;

a fourth pulley connected with the third pulley by a second belt and fixed on the third arm in such a manner that the center axis thereof is coincident with the third shaft;

a first arm drive means arranged at a position in opposed relation with the first pulley substantially in the neighborhood of the first shaft; and a second arm drive means arranged at a position in opposed relation with the second and third pulleys substantially in the neighborhood of the second shaft;

wherein the first pulley and the second pulley have the same diameter, and the third pulley and the fourth pulley have the same diameter.

5. A molded component retrieving apparatus according to claim 4, wherein the first pulley, the second pulley, the third pulley and the fourth pulley have a hollow portion, and at least a selected one of a cable and a hose is passed through the hollow portions of the first pulley, the second pulley, the third pulley and the fourth pulley.

6. A molded component retrieving apparatus according to claim 5, wherein the first arm, the second arm and the third arm have a hollow portion, and at least a selected one of a cable and a hose is passed through the hollow portions of the first arm, the second arm and the third arm.

7. A molded component retrieving apparatus according to claim 3, wherein the fifth pulley, the sixth pulley and the seventh pulley have a hollow portion, and at least a selected one of a cable and a hose is passed through the hollow portions of the fifth pulley, the sixth pulley and the seventh pulley.

8. A molded component retrieving apparatus according to claim 7, wherein the fourth arm, the fifth arm and the sixth arm have a hollow portion, and at least a selected one of a cable and a hose is passed through the hollow portions of the fourth arm, the fifth arm and the sixth arm.

9. A molded component retrieving apparatus according to claim 1, further comprising a mounting position changing means mounted on the base whereby the position at which the base is fixedly mounted can be displaced in the direction perpendicular to the length of the molding machine.

10. A molding machine having mounted thereon the molded component retrieving apparatus according to claim 1.

11. A molded component retrieving apparatus according to claim 6, wherein at least one pulley of the first pulley, the second pulley and the third pulley is projected into the hollow portion of the arm corresponding to the at least one pulley.

12. A molded component retrieving apparatus according to claim 8, wherein at least one pulley of the fifth pulley, the sixth pulley and the seventh pulley is projected into the hollow portion of the arm corresponding to the at least one pulley.

13. A molded component retrieving apparatus mounted on a molding machine, to retrieve a molded component when the die of the molding machine opens, comprising:

a base fixed on the molding machine;

a first unit being disposed on the base and positioning a first lift arm with respect to the base; and a second unit being disposed on the first unit and positioning a second lift arm with respect to the first lift arm;

wherein the first unit comprises;

a first arm with a first end thereof mounted pivotably around a first shaft perpendicular to the base;

a second arm with a first end thereof mounted at a second end of the first arm pivotably around a second shaft parallel to the first shaft;

a third arm with a first end thereof mounted at a second end of the second arm pivotably around a third shaft parallel to the second shaft;

an intermediate base member coupled to the third arm;

a fourth arm with a first end thereof mounted on the intermediate base member pivotably around a fourth shaft parallel to the third shaft;

a fifth arm with a first end thereof mounted at a second end of the fourth arm pivotably around a fifth shaft parallel to the fourth shaft; and a sixth arm with a first end thereof mounted at a second end of the fifth arm pivotably around a sixth shaft parallel to the fifth shaft, wherein the first lift arm comprises at least one of a hand and an adsorber disposed at an end of the first lift arm and adapted to reciprocate parallel to the third shaft and with respect to the third arm, and the second lift arm comprises a hand disposed at an end of the second lift arm and adapted to reciprocate parallel to the sixth shaft and with respect to the sixth arm.

14. A molded component retrieving apparatus mounted on a molding machine, to retrieve a molded component when the die of the molding machine opens, comprising:

a base fixed on the molding machine;

a first unit being disposed on the base and positioning a first lift arm with respect to the base; and a second unit being disposed on the first unit and positioning a second lift arm with respect to the first lift arm;

wherein the first unit comprises:

a first arm with a first end thereof mounted pivotably around a first shaft perpendicular to the base;

a second arm with a first end thereof mounted at a second end of the first arm pivotably around a second shaft parallel to the first shaft;

a third arm with a first end thereof mounted at a second end of the second arm pivotably around a third shaft parallel to the second shaft; and an intermediate base member coupled to the third arm, wherein the first lift arm is disposed on the third arm and the intermediate base member is detachably coupled to the third arm.

* * * * *